United States Patent
Lee et al.

(10) Patent No.: US 11,718,714 B2
(45) Date of Patent: Aug. 8, 2023

(54) POLYAMIDES, AND METHODS OF PRODUCING THEREOF

(71) Applicant: Novomer, Inc., Boston, MA (US)

(72) Inventors: Han Lee, Boston, MA (US); Sadesh H. Sookraj, Boston, MA (US); Alexander Tseitlin, Boston, MA (US)

(73) Assignee: Novomer, Inc., Rochester, NY (US)

( * ) Notice: Subject to any disclaimer, the term of this patent is extended or adjusted under 35 U.S.C. 154(b) by 387 days.

(21) Appl. No.: 16/494,635

(22) PCT Filed: Mar. 13, 2018

(86) PCT No.: PCT/US2018/022248
§ 371 (c)(1),
(2) Date: Sep. 16, 2019

(87) PCT Pub. No.: WO2018/170006
PCT Pub. Date: Sep. 20, 2018

(65) Prior Publication Data
US 2020/0087457 A1    Mar. 19, 2020

Related U.S. Application Data

(60) Provisional application No. 62/473,008, filed on Mar. 17, 2017.

(51) Int. Cl.
*C08G 69/22* (2006.01)
*C08G 69/16* (2006.01)
*C08G 69/04* (2006.01)
*C08G 69/08* (2006.01)

(52) U.S. Cl.
CPC ............ *C08G 69/22* (2013.01); *C08G 69/16* (2013.01)

(58) Field of Classification Search
None
See application file for complete search history.

(56) References Cited

U.S. PATENT DOCUMENTS

| | | | | |
|---|---|---|---|---|
| 2,375,005 | A | * 5/1945 | Kung | C07C 231/02 558/311 |
| 2,508,279 | A | * 5/1950 | Lichtenwalter | C07C 233/09 564/205 |
| 2,525,794 | A | 10/1950 | Gresham | |
| 2,548,155 | A | * 4/1951 | Gresham | C07D 295/182 564/133 |

(Continued)

FOREIGN PATENT DOCUMENTS

| JP | 2003137850 A | 5/2003 |
|---|---|---|
| JP | 4356292 B2 | 11/2009 |

(Continued)

OTHER PUBLICATIONS

Office Action (and English translation) issued in co-pending application JP 2020-513756 dated Feb. 19, 2021. 16 pages.

(Continued)

*Primary Examiner* — Randy P Gulakowski
*Assistant Examiner* — Ha S Nguyen
(74) *Attorney, Agent, or Firm* — Young Basile Hanlon & MacFarlane, P.C.

(57) ABSTRACT

Provided are methods of producing polyamides from beta-lactones. The polyamides include bio-based polyamides that may be obtained, either in part or completely, from renewable sources.

35 Claims, 1 Drawing Sheet

(56) References Cited

U.S. PATENT DOCUMENTS

| | | | |
|---|---|---|---|
| 2,691,643 A | | 10/1954 | Chirtel |
| 3,211,706 A | | 10/1965 | Borner |
| 3,471,451 A | * | 10/1969 | Moore .................. C08G 69/00 528/361 |
| 3,525,718 A | | 8/1970 | Derieg |
| 3,885,155 A | | 5/1975 | Anbar |
| 4,427,884 A | | 1/1984 | Anbar et al. |
| 4,973,841 A | | 11/1990 | Purser |
| 5,138,086 A | | 8/1992 | Honda et al. |
| 5,310,948 A | * | 5/1994 | Drent ..................... C07C 67/37 549/328 |
| 5,438,194 A | | 8/1995 | Koudijs et al. |
| 5,661,299 A | | 8/1997 | Purser |
| 2007/0219397 A1 | | 9/2007 | Holladay et al. |
| 2019/0002293 A1 | | 1/2019 | Sookraj et al. |

FOREIGN PATENT DOCUMENTS

| | | |
|---|---|---|
| WO | 03018540 A1 | 3/2003 |
| WO | 2009/155086 A2 | 12/2009 |
| WO | 2012/158573 A1 | 11/2012 |
| WO | 2013/063191 A1 | 5/2013 |
| WO | 2016/015019 A1 | 1/2016 |
| WO | 2016/130977 A1 | 8/2016 |

OTHER PUBLICATIONS

Gresham, T.L. et al. "Reactions With Ammonia and Amines." Journal of the American Chemical Society, 1951, 73, 7, 3168-3171.

International Preliminary Report on Patentability for co-pending PCT/US2018/022248 dated Apr. 21, 2018 (7 pages).

International Search Report and Written Opinion for co-pending PCT/US2018/022248 US2018/022248 dated May 24, 2018 (9 pages).

International Search Report and Written Opinion for co-pending PCT/US2020/020317 dated Jul. 14, 2020. (15 pages).

Stewart, D. Work et al. "Condensations at the Methyl Groups of N-Acetylbenzamide and Diacetylimide by Means of Potassium Amide in Liquid Ammonia." Journal of the American Chemical Society, vol. 86, No. 5, Mar. 1, 1964, pp. 872-876.

Search Report for Taiwan Patent Application No. 107108981. Date of completion: Nov. 6, 2020.

Steunenberg, Peter et al., "Polymerisation of b-alanine through catalytic ester-amide exchange", European Polymer Journal, Pergamon Press Ltd. Oxford, GB, vol. 49, No. 7, Apr. 9, 2013, pp. 1773-1781.

Extended European Search Report for co-pending European Application EP 18 76 8532 dated Dec. 2, 2020 (9 pages).

Office Action issued in co-pending Application No. CN 201880027660.X dated Oct. 11, 2021, with English translation (15 pages).

* cited by examiner

POLYAMIDES, AND METHODS OF PRODUCING THEREOF

CROSS-REFERENCE TO RELATED APPLICATION

This application is a national stage application under 35 U.S.C. § 371 of International Application No. PCT/US2018/022248, filed internationally on Mar. 13, 2018, which claims priority to U.S. Provisional Patent Application No. 62/473,008, filed Mar. 17, 2017, which is incorporated herein by reference in its entirety.

FIELD

The present disclosure relates generally to polyamides and methods of producing thereof, and more specifically to polyamides that may be produced from beta-lactones.

BACKGROUND

Polyamides are used in various applications, including textiles, fabrics, automotive applications, carpets, and coatings. Nylon is an example of a polyamide, often used in fibers (e.g., for apparel, flooring and rubber reinforcement), in shapes (e.g., for molded parts for cars and electrical equipment), and in films (e.g., for food packaging). Various methods are known in the art to industrially synthesize polyamides. For example, polyamides can be synthesized from dinitriles using acid catalysis via a Ritter reaction. See e.g., Lakouraj, M. M. & Mokhtary, M., J. Polym. Res. (2009) 16: 681.

Alternative methods of producing polyamides are desired in the art, including methods of producing bio-based polyamides that can be obtained, either in part or completely, from renewable sources.

BRIEF SUMMARY

Provided herein are methods of producing polyamides that can be obtained, either in part or completely, from renewable sources. For example, in some aspects, the polyamides may be produced from beta-propiolactone, which can be obtained from bio-based ethylene oxide and/or bio-based carbon monoxide.

In some aspects, provided is a method of producing a polymer, comprising:
combining a compound of formula (3-a) with a weak base to produce the polymer, wherein:
the compound of formula (3-a) is (3-a)

wherein each $R^{1a}$, $R^{1b}$, $R^{1c}$, $R^{1d}$ and $R^2$ is independently H or alkyl, and the polymer comprises repeating units of formula or a salt thereof, wherein $R^{1a}$, $R^{1b}$, $R^{1c}$, $R^{1d}$ and $R^2$ are as defined above for formula (3-a).

In other aspects, provided is method of producing a polymer, comprising:
a) combining a compound of formula (3-b) with an alcohol of formula (4) and a halogenating agent to produce a compound of formula (5), wherein:
the compound of formula (3-b) is (3-b)

wherein each $R^{1a}$, $R^{1b}$, $R^{1c}$, $R^{1d}$ and $R^2$ is independently H or alkyl, the alcohol of formula (4) is $R^3OH$, wherein $R^3$ is alkyl, and
the compound of formula (5) is wherein $R^{1a}$, $R^{1b}$, $R^{1c}$, $R^{1d}$ and $R^2$ are as defined above for formula (3-b), and $R^3$ is as defined above for formula (4); and
b) condensing the compound of formula (5) to produce the polymer,
wherein the polymer comprises repeating units of formula wherein $R^{1a}$, $R^{1b}$, $R^{1c}$, $R^{1d}$ and $R^2$ are as defined above for formula (3-b).

In some variations of the foregoing, the compound of formula (3-a) or (3-b) is produced by combining a compound of formula (1) with a nitrogen-containing compound of formula (2), wherein:
the compound of formula (1) is wherein each $R^{1a}$, $R^{1b}$, $R^{1c}$ and $R^{1d}$ is independently H or alkyl, and the nitrogen-containing compound of formula (2) is $R^2$—$NH_2$, wherein $R^2$ is H or alkyl.

In certain variations, when the compound of formula (1) is combined with a nitrogen-containing compound of formula (2) under aqueous conditions, the compound of formula (3-a) is selectively produced. For example, in certain variations, when the compound of formula (1) is combined with an aqueous nitrogen-containing compound of formula (2), the compound of formula (3-a) is selectively produced.

In other variations, when the compound of formula (1) is combined with a nitrogen-containing compound of formula (2) under non-aqueous conditions, the compound of formula (3-b) is selectively produced. For example, in certain variations, when the compound of formula (1) is combined with a nitrogen-containing compound of formula (2) in the presence of an organic solvent, the compound of formula (3-b) is selectively produced.

DESCRIPTION OF THE FIGURES

The present application can be best understood by reference to the following description taken in conjunction with the accompanying figures, in which like parts may be referred to by like numerals.

DETAILED DESCRIPTION

The following description sets forth exemplary methods, parameters and the like. It should be recognized, however, that such description is not intended as a limitation on the scope of the present disclosure but is instead provided as a description of exemplary embodiments.

Provided herein are methods to produce polyamides from beta-lactones. In some aspects, provided is a method of producing a polyamide that includes combining a compound of formula (3-a) with a weak base to produce the polyamide. The compound of formula (3-a) is (3-a)

wherein each $R^{1a}$, $R^{1b}$, $R^{1c}$, $R^{1d}$ and $R^2$ is independently H or alkyl. The polyamide is a polymer comprising repeating units of formula or a salt thereof, wherein $R^{1a}$, $R^{1b}$ and $R^2$ are as defined above for formula (3-a). Without wishing to be bound by any theory, in some variations, combining the compound of formula (3-a) and the weak base may produce an intermediate having the structure which then undergoes a Michael addition to produce the polyamide described above.

In other aspects, provided is a method of producing a polyamide that includes combining a compound of formula (3-b) with an alcohol of formula (4) and a halogenating agent to produce a compound of formula (5). The compound of formula (3-b) is (3-b)

wherein each $R^{1a}$, $R^{1b}$, $R^{1c}$, $R^{1d}$ and $R^2$ is independently H or alkyl. The alcohol of formula (4) is $R^3OH$, wherein $R^3$ is alkyl. The compound of formula (5) is wherein $R^{1a}$, $R^{1b}$, $R^{1c}$, $R^{1d}$ and $R^2$ are as defined above for formula (3-b), and $R^3$ is as defined above for formula (4). The resulting compound of formula (5) then undergoes a condensation polymerization to produce the polyamide. The polyamide is a polymer comprising repeating units of formula wherein $R^{1a}$, $R^{1b}$, $R^{1c}$ and $R^2$ are as defined above for formula (3-b).

In some variations of the foregoing methods, the compound of formula (3-a) or (3-b), or a combination thereof, may be produced from beta-lactone. For example, in one variation, a compound of formula (1) is combined with a nitrogen-containing compound of formula (2) to produce the compound of formula (3-a) or (3-b), or a combination thereof. The compound of formula (1) is wherein each $R^{1a}$, $R^{1b}$, $R^{1c}$ and $R^{1d}$ is independently H or alkyl. The nitrogen-containing compound of formula (2) is $R^2$—$NH_2$ wherein $R^2$ is H or alkyl. As discussed in further detail herein, the production of the compound of formula (3-a) may be favored over the production of compound of formula (3-b), and vice versa, based on the conditions under which the compound of formula (1) is combined with the nitrogen-containing compound of formula (2).

In yet other aspects, provided is a polyamide produced according to any of the methods described herein.

The methods, the compounds and other agents used to produce the polyamides, and the resulting polyamides, are described in further detail below.

Polymerization of a Compound of Formula (3-a) to Produce a Polyamide

Figure 1:
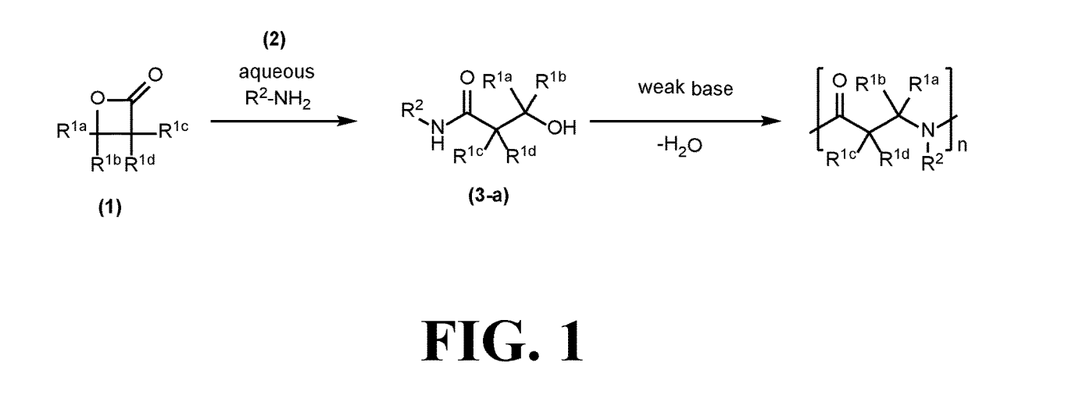
FIGS. 1 and 2 depict exemplary reaction schemes to produce polyamides from beta-lactones.

With reference to FIG. 1, an exemplary method to produce a polyamide is provided. In some embodiments, a compound of formula (3-a) is polymerized in the presence of a weak base to produce the polyamide.

Compound of Formula (3-a)

In some embodiments, the compound of formula (3-a) is

(3-a)

wherein each $R^{1a}$, $R^{1b}$, $R^{1c}$, $R^{1d}$ and $R^2$ is independently H or alkyl. In one variation, $R^{1a}$ is H. In other variations, $R^{1a}$ is alkyl. In certain variations, $R^{1a}$ is $C_{1-6}$ alkyl. In another variation, $R^{1a}$ is methyl, ethyl or propyl. In one variation, $R^{1b}$ is H. In other variations, $R^{1b}$ is alkyl. In certain variations, $R^{1b}$ is $C_{1-6}$ alkyl. In another variation, $R^{1b}$ is methyl, ethyl or propyl. In one variation, $R^{1c}$ is H. In other variations, $R^{1c}$ is alkyl. In certain variations, $R^{1c}$ is $C_{1-6}$ alkyl. In another variation, $R^{1c}$ is methyl, ethyl or propyl. In one variation, $R^{1d}$ is H. In other variations, $R^{1d}$ is alkyl. In certain variations, $R^{1d}$ is $C_{1-6}$ alkyl. In another variation, $R^{1d}$ is methyl, ethyl or propyl. In one variation, $R^2$ is H. In other variations, $R^2$ is alkyl. In certain variations, $R^2$ is $C_{1-6}$ alkyl. In another variation, $R^2$ is methyl, ethyl or propyl.

"Alkyl" refers to a monoradical unbranched or branched saturated hydrocarbon chain. In some embodiments, alkyl has 1 to 6 carbon atoms (i.e., $C_{1-6}$ alkyl), 1 to 5 carbon atoms (i.e., $C_{1-5}$ alkyl), 1 to 4 carbon atoms (i.e., $C_{1-4}$ alkyl), 1 to 3 carbon atoms (i.e., $C_{1-3}$ alkyl), or 1 to 2 carbon atoms (i.e., $C_{1-2}$ alkyl). In certain variations, alkyl groups may include methyl, ethyl, propyl, isopropyl, n-butyl, sec-butyl, tert-butyl, pentyl, 2-pentyl, isopentyl, neopentyl, hexyl, 2-hexyl, 3-hexyl, and 3-methylpentyl. When an alkyl residue having a specific number of carbons is named, all geometric isomers having that number of carbons may be encompassed; thus, for example, "butyl" can include n-butyl, sec-butyl, isobutyl and t-butyl; "propyl" can include n-propyl and isopropyl.

Further, it should be understood that when a range of values is listed, it is intended to encompass each value and sub-range within the range. For example, "$C_{1-6}$ alkyl" (which may also be referred to as 1-6C alkyl, C1-C6 alkyl, or C1-6 alkyl) is intended to encompass, $C_1$, $C_2$, $C_3$, $C_4$, $C_5$, $C_6$, $C_{1-6}$, $C_{1-5}$, $C_{1-4}$, $C_{1-3}$, $C_{1-2}$, $C_{2-6}$, $C_{2-5}$, $C_{2-4}$, $C_{2-3}$, $C_{3-6}$, $C_{3-5}$, $C_{3-4}$, $C_{4-6}$, $C_{4-5}$, and $C_{5-6}$ alkyl.

It should generally be understood that any description of $R^{1a}$, $R^{1b}$, $R^{1c}$, $R^{1d}$ and $R^2$ described herein may be combined the same as if each and every combination were individually listed. For example, in one embodiment, the compound of formula (3-a) is (also referred to as 3-hydroxypropanamide), in which $R^{1a}$, $R^{1b}$, $R^{1c}$, $R^{1d}$ and $R^2$ are all H. In another embodiment, the compound of formula (3-a) is in which one of $R^{1a}$ and $R^{1b}$ is H, the remaining $R^{1a}$ and $R^{1b}$ is methyl, and $R^{1c}$, $R^{1d}$ and $R^2$ are all H. In yet another embodiment, the compound of formula (3-a) is in which $R^{1a}$, $R^{1b}$, $R^{1c}$ and $R^{1d}$ are all H, and $R^2$ is ethyl.

Base

In some variations, the compound of formula (3-a) is polymerized in the presence of a weak base to produce the polyamide. In some variations, the weak base has a pKb value between 7.2 and 10.4. Thus, in certain aspects, provided is a method comprising polymerizing the compound of formula (3-a) in the presence of a base having a pKb value between 7.2 and 10.4 to produce the polyamide. In certain variations of the foregoing, the pKb value is between 7.4 and 10.3.

It should also be understood that reference to "between" two values or parameters herein includes (and describes) embodiments that include those two values or parameters per se. For example, description referring to "between x and y" includes description of "x" and "y" per se.

In certain variations, the base is a carbonate salt or a bicarbonate salt, or a combination thereof. In one variation, the base is sodium carbonate, potassium carbonate, calcium carbonate, magnesium carbonate, sodium bicarbonate, potassium bicarbonate, calcium bicarbonate, or magnesium bicarbonate or any combinations thereof.

Reaction Temperature

In some embodiments, the polyamide is produced from the compound of formula (3-a) at a temperature of at least 70° C., at least 80° C., at least 90° C., at least 100° C., at least 110° C., at least 120° C., at least 130° C., at least 140° C., or at least 150° C.; or between 80° C. to 160° C.

Condensation Polymerization to Produce a Polyamide

Figure 2:
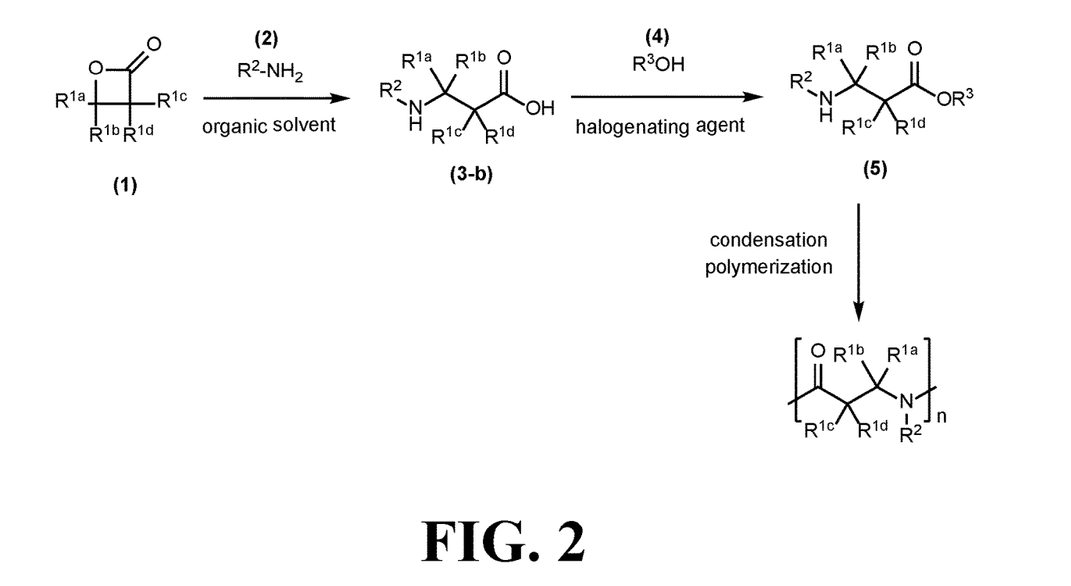

With reference to FIG. 2, another exemplary method to produce a polyamide is provided. In some embodiments, a compound of formula (3-b) is combined with an alcohol to produce the compound of formula (5), which can then undergo condensation polymerization to produce the polyamide. In some variations, the compound of formula (3-b) is combined with an alcohol and any suitable agent that can convert a carboxylic acid to acyl halide. In certain variations, such agent may be a halogenating agent.

In some embodiments of the exemplary method depicted in FIG. 2, the compound of formula (5) may be isolated, and optionally purified, before undergoing condensation polymerization to produce the polyamide. In other embodiments, the compound of formula (5) is neither isolated nor purified before further use.

Compound of Formula (3-b)

In some embodiments, the compound of formula (3-b) is (3-b)

wherein each $R^{1a}$, $R^{1b}$, $R^{1c}$, $R^{1d}$ and $R^2$ is independently H or alkyl. In one variation, $R^{1a}$ is H. In other variations, $R^{1a}$ is alkyl. In certain variations, $R^{1a}$ is $C_{1-6}$ alkyl. In another variation, $R^{1a}$ is methyl, ethyl or propyl. In one variation, $R^{1b}$ is H. In other variations, $R^{1b}$ is alkyl. In certain variations, $R^{1b}$ is $C_{1-6}$ alkyl. In another variation, $R^{1b}$ is methyl, ethyl or propyl. In one variation, $R^{1c}$ is H. In other variations, $R^{1c}$ is alkyl. In certain variations, $R^{1c}$ is $C_{1-6}$ alkyl. In another variation, $R^{1c}$ is methyl, ethyl or propyl. In one variation, $R^{1d}$ is H. In other variations, $R^{1d}$ is alkyl. In certain variations, $R^{1d}$ is $C_{1-6}$ alkyl. In another variation, $R^{1d}$ is methyl, ethyl or propyl. In one variation, $R^2$ is H. In other variations, $R^2$ is alkyl. In certain variations, $R^2$ is $C_{1-6}$ alkyl. In another variation, $R^2$ is methyl, ethyl or propyl.

It should generally be understood that any description of $R^{1a}$, $R^{1b}$, $R^{1c}$, $R^{1d}$ and $R^2$ described herein may be combined the same as if each and every combination were individually listed. For example, in one embodiment, the compound of formula (3-b) is (also referred to as 3-aminopropanoic acid), in which $R^{1a}$, $R^{1b}$, $R^{1c}$, $R^{1d}$ and $R^2$ are all H. In another embodiment, the compound of formula (3-b) is in which one of $R^{1a}$ and $R^{1b}$ is H, the remaining $R^{1a}$ and $R^{1b}$ is methyl, and $R^{1c}$, $R^{1d}$ and $R^2$ are all H. In yet another embodiment, the compound of formula (3-b) is in which $R^{1a}$, $R^{1b}$, $R^{1c}$ and $R^{1d}$ are all H, and $R^2$ is ethyl.

Alcohol

In some embodiments, the alcohol is a compound of formula (4) is $R^3OH$, wherein $R^3$ is alkyl. In some variations, $R^3$ is $C_{1-6}$ alkyl. In one variation, $R^3$ is methyl or ethyl.

Compound of Formula (5)

In some embodiments, the compound of formula (5) is wherein $R^{1a}$, $R^{1b}$, $R^{1c}$, $R^{1d}$ and $R^2$ are as defined above for formula (3-b), and $R^3$ is as defined above for formula (4).

It should generally be understood that any of the compounds of formula (3-b) described herein may be combined with any of the alcohols of formula (4) described herein the same as if each and every combination were individually listed. For example, in one embodiment, when the compound of formula (3-b) is and the alcohol is methanol, the compound of formula (5) is Halogenating Agent In some variations, the halogenating agent is a chlorinating agent. In other variations, the halogenating agent is a brominating agent. In one variation, the halogenating agent is $SOCl_2$, $POCl_3$, $PCl_3$, $SOBr_2$, $POBr_3$, or $PBr_3$, or any combinations thereof.

Anhydrous Conditions

In some embodiments, the exemplary method depicted in FIG. 2 is performed under anhydrous conditions. In some variations, the compound of formula (3-b) is combined with the alcohol of formula (4) and the halogenating agent under anhydrous conditions to produce the compound of formula (5). In other variations, the compound of formula (3-b), the alcohol of formula (4), and the halogenating agent are dry reagents. In one variation, the compound of formula (3-b), the alcohol of formula (4), and the halogenating agent each independently has less than 5%, less than 4%, less than 3%, less than 2%, less than 1%, less than 0.5%, less than 0.1%, or less than 0.01% by weight of water.

Condensation Polymerization

Any suitable conditions to convert the compound of formula (5) via condensation polymerization to the polyamide may be employed.

Production of a Compound of Formula (3-a) or (3-b) from Beta-Lactone

The compounds of formulae (3-a) and (3-b) used in the methods described herein may be obtained from any commercially available sources or produced according to any methods known in the art. For example, the compounds of formulae (3-a) and (3-b) may be produced by reacting a beta-lactone with a primary amine. With reference to FIGS.

1 and 2, in the exemplary methods provided, the compound of formula (1) is an exemplary beta-lactone that is reacted with primary amine, R²—NH₂, wherein R² is H or alkyl.

In some embodiments of the exemplary methods depicted in FIGS. 1 and 2, the compound of formula (3-a) or (3-b) may be isolated, and optionally purified, before use in subsequent steps. In other embodiments, the compound of formula (3-a) or (3-b) is neither isolated nor purified before further use.

Selectively Producing the Compound of Formula (3-a) vs. (3-b)

The compound of formula (1) may be combined with the primary amine under conditions that selectively favor production of the compound of formula (3-a) over the compound of formula (3-b), and vice versa.

In certain variations, the compound of formula (1) is combined with a nitrogen-containing compound of formula (2) under aqueous conditions to favor production of the compound of formula (3-a) over the compound of formula (3-b). In certain variations, an aqueous nitrogen-containing compound of formula (2) is used. For example, in one variation when the nitrogen-containing compound of formula (2) is ammonia, aqueous ammonia may be used. Under such conditions, the compound of formula (3-a) is produced in excess as compared to the compound of formula (3-b).

In other variations, the compound of formula (1) is combined with a nitrogen-containing compound of formula (2) and an organic solvent to favor production of the compound of formula (3-b) over the compound of formula (3-a). In certain variations, the organic solvent comprises alcohols. In other variations, the organic solvent comprises acetonitrile. In other variations, the compound of formula (1) is combined with a nitrogen-containing compound of formula (2) under non-aqueous conditions to favor production of the compound of formula (3-b) over the compound of formula (3-a). Under such conditions, the compound of formula (3-b) is produced in excess as compared to the compound of formula (3-a).

Compound of Formula (1)

In some embodiments, the compound of formula (1) is wherein each $R^{1a}$, $R^{1b}$, $R^{1c}$ and $R^{1d}$ is independently H or alkyl. In one variation, $R^{1a}$ is H. In other variations, $R^{1a}$ is alkyl. In certain variations, $R^{1a}$ is $C_{1-6}$ alkyl. In another variation, $R^{1a}$ is methyl, ethyl or propyl. In one variation, $R^{1b}$ is H. In other variations, $R^{1b}$ is alkyl. In certain variations, $R^{1b}$ is $C_{1-6}$ alkyl. In another variation, $R^{1b}$ is methyl, ethyl or propyl. In one variation, $R^{1c}$ is H. In other variations, $R^{1c}$ is alkyl. In certain variations, $R^{1c}$ is $C_{1-6}$ alkyl. In another variation, $R^{1c}$ is methyl, ethyl or propyl. In one variation, $R^{1d}$ is H. In other variations, $R^{1d}$ is alkyl. In certain variations, $R^{1d}$ is $C_{1-6}$ alkyl. In another variation, $R^{1d}$ is methyl, ethyl or propyl.

It should generally be understood that any description of $R^{1a}$, $R^{1b}$, $R^{1c}$ and $R^{1d}$ described herein may be combined the same as if each and every combination were individually listed. For example, in one embodiment, the compound of formula (1) is (also referred to as beta-propiolactone), in which $R^{1a}$, $R^{1b}$, $R^{1c}$ and $R^{1d}$ are all H.

The beta-lactone, such as the compound of formula (1), may be obtained from any commercially available sources or produced according to any methods known in the art. For example, beta-propiolactone may be obtained by reacting ethylene oxide and carbon monoxide under suitable conditions.

The beta-lactone, such as the compound of formula (1), may be obtained from renewable feedstock. For example, when beta-propiolactone is produced from ethylene oxide and carbon monoxide, either or both the ethylene oxide and carbon monoxide may be obtained from renewable feedstock using methods known in the art. When the beta-lactone, such as the compound of formula (1), is obtained in part or completely from renewable feedstock, the polyamide produced according to the methods described herein from such beta-lactone has a biocontent greater than 0%.

Various techniques are known in the art to determine biocontent of a material. For example, in some variations, biocontent of a material may be measured using the ASTM D6866 method, which allows the determination of the biocontent of materials using radiocarbon analysis by accelerator mass spectrometry, liquid scintillation counting, and isotope mass spectrometry. A biocontent result may be derived by assigning 100% equal to 107.5 pMC (percent modern carbon) and 0% equal to 0 pMC. For example, a sample measuring 99 pMC will give an equivalent biocontent result of 93%. In one variation, biocontent may be determined in accordance with ASTM D6866 revision 12 (i.e., ASTM D6866-12). In another variation, biocontent may be determined in accordance with the procedures of Method B of ASTM-D6866-12. Other techniques for assessing the biocontent of materials are described in U.S. Pat. Nos. 3,885,155, 4,427,884, 4,973,841, 5,438,194, and 5,661,299, as well as WO2009/155086.

Compound of Formula (2)

In some embodiments, the compound of formula (2) is R²—NH₂, wherein R² is H or alkyl. In some variations, R² is H, and the compound of formula (2) is NH₃ or ammonia. In other variations, R² is alkyl. In certain variations, R² is $C_{1-6}$ alkyl. In one variation, R² is methyl, ethyl, propyl or butyl.

The primary amine, such as the compound of formula (2), may be obtained from any commercially available sources or produced according to any methods known in the art.

The primary amine, such as the compound of formula (2), may be obtained from renewable feedstock. When the primary amine, such as the compound of formula (2), is obtained from renewable feedstock, the polyamide produced according to the methods described herein from such beta-lactone has a biocontent greater than 0%.

It should generally be understood that any of the compounds of formula (1) described herein may be combined with any of the amines of formula (2) described herein the same as if each and every combination were individually listed. Further, one of ordinary skill in the art would recognize how to select suitable compounds of formulae (1) and (2) in order to produce the compound of formula (3-a) or (3-b). Specifically, $R^{1a}$, $R^{1b}$, $R^{1c}$ and $R^{1d}$ for formula (3-a) or (3-b) are as defined herein for formula (1), and R² is as defined herein for formula (2). For example, in one embodiment, when the compound of formula (1) is and the compound of formula (2) is $NH_3$, then the resulting compound of formula (3-a) is and the resulting compound of formula (3-b) is depending on the conditions of the reaction.

Polyamide

In some aspects, the polyamide produced from the methods described herein is a polymer comprising repeating units of formula or a salt thereof, wherein $R^{1a}$, $R^{1b}$, $R^{1c}$, $R^{1d}$ and $R^2$ are as defined above for formula (3-a) or (3-b), as the case may be. For example, in one embodiment, when the compound of formula (3-a) is and is reacted with a weak base, the resulting polymer comprises repeating units of formula or a salt thereof. In another embodiment, when the compound of formula (3-b) is and is reacted with an alcohol and a halogenating agent, followed by condensation polymerization, the resulting polymer comprises repeating units of formula In some embodiments, provided is a polyamide having a biocontent of at least 10%, at least 20%, at least 30%, at least 40%, at least 50%, at least 60%, at least 70%, at least 80%, at least 90%, at least 95% or about 100%.

It should be understood that reference to "about" a value or parameter herein includes (and describes) embodiments that are directed to that value or parameter per se. For example, description referring to "about x" includes description of "x" per se. In other instances, the term "about" when used in association with other measurements, or used to modify a value, a unit, a constant, or a range of values, refers to variations of +/−10%.

Compositions

In some aspects, provided is a composition comprising:
a compound of formula (3-a) having the structure:

(3-a)

wherein each $R^{1a}$, $R^{1b}$, $R^{1c}$, $R^{1d}$ and $R^2$ is independently H or alkyl; and
a weak base.

In some embodiments of the foregoing, the composition further comprises:
a polymer comprising repeating units of formula or a salt thereof, wherein $R^{1a}$, $R^{1b}$, $R^{1c}$, $R^{1d}$ and $R^2$ are as defined above for formula (3-a).

In other aspects, provided is a composition comprising:
a compound of formula (3-b) having the structure:

(3-b)

wherein each $R^{1a}$, $R^{1b}$, $R^{1c}$, $R^{1d}$ and $R^2$ is independently H or alkyl;
an alcohol of formula (4) having the structure $R^3OH$, wherein $R^3$ is alkyl; and
a halogenating agent.

In some embodiments of the foregoing, the composition further comprises:
a compound of formula (5) having the structure:

wherein $R^{1a}$, $R^{1b}$, $R^{1c}$, $R^{1d}$ and $R^2$ are as defined above for formula (3-b), and $R^3$ is as defined above for formula (4).

In other aspects, provided is a composition comprising:
a compound of formula (5) having the structure:

wherein each $R^{1a}$, $R^{1b}$, $R^{1c}$, $R^{1d}$ and $R^2$ is independently H or alkyl, and $R^3$ is alkyl; and
a polymer comprises repeating units of formula wherein $R^{1a}$, $R^{1b}$, $R^{1c}$, $R^{1d}$ and $R^2$ are as defined above for formula (5).

It should be understood that any of the variations described herein with respect to the methods for the compound of formula (3-a), the compound of formula (3-b), the alcohol of formula (4), the compound of formula (5), the weak base, the halogenating agent, and the polymer apply to the compositions described herein.

ENUMERATED EMBODIMENTS

The following enumerated embodiments are representative of some aspects of the invention.
1. A method of producing a polymer, comprising:
combining a compound of formula (3-a) with a weak base to produce the polymer, wherein:
the compound of formula (3-a) is (3-a)

wherein each $R^{1a}$, $R^{1b}$, $R^{1c}$, $R^{1d}$ and $R^2$ is independently H or alkyl, and the polymer comprises repeating units of formula or a salt thereof, wherein $R^{1a}$, $R^{1b}$, $R^{1c}$, $R^{1d}$ and $R^2$ are as defined above for formula (3-a).
2. A method of producing a polymer comprising:
a) combining a compound of formula (1) with a nitrogen-containing compound of formula (2) under aqueous conditions to produce a compound of formula (3-a), wherein:
the compound of formula (1) is wherein each $R^{1a}$, $R^{1b}$, $R^{1c}$ and $R^{1d}$ is independently H or alkyl,
the nitrogen-containing compound of formula (2) is $R^2$—$NH_2$, wherein $R^2$ is H or alkyl, and
the compound of formula (3-a) is (3-a)

wherein $R^{1a}$, $R^{1b}$, $R^{1c}$ and $R^{1d}$ are as defined above for formula (1), and $R^2$ is as defined above for formula (2); and
b) combining the compound of formula (3-a) with a weak base to produce the polymer,
wherein the polymer comprises repeating units of formula or a salt thereof, wherein $R^{1a}$, $R^{1b}$, $R^{1c}$, $R^{1d}$ and $R^2$ are as defined above for formula (3-a).
3. The method of embodiment 2, further comprising isolating the compound of formula (3-a) prior to combining with the weak base to produce the polymer.
4. The method of any one of embodiments 1 to 3, wherein the nitrogen-containing compound of formula (2) is an aqueous nitrogen-containing compound of formula (2).
5. The method of any one of embodiments 1 to 4, wherein the weak base has a pKb value between 7.2 and 10.4.
6. The method of any one of embodiments 1 to 4, wherein the weak base is a carbonate salt or a bicarbonate salt, or a combination thereof.

7. The method of any one of embodiments 1 to 4, wherein the weak base is sodium carbonate, potassium carbonate, calcium carbonate, magnesium carbonate, sodium bicarbonate, potassium bicarbonate, calcium bicarbonate, or magnesium bicarbonate or any combinations thereof.

8. The method of any one of embodiments 1 to 7, wherein the polymer is produced from the compound of formula (3-a) at a temperature of at least 70° C.

9. The method of any one of embodiments 1 to 7, wherein the polymer is produced from the compound of formula (3-a) at a temperature between 80° C. to 160° C.

10. A method of producing a polymer, comprising:

a) combining a compound of formula (3-b) with an alcohol of formula (4) and a halogenating agent to produce a compound of formula (5), wherein:

the compound of formula (3-b) is (3-b)

wherein each $R^{1a}$, $R^{1b}$, $R^{1c}$, $R^{1d}$ and $R^2$ is independently H or alkyl, the alcohol of formula (4) is $R^3OH$, off wherein $R^3$ is alkyl, and the compound of formula (5) is wherein $R^{1a}$, $R^{1b}$, $R^{1c}$, $R^{1d}$ and $R^2$ are as defined above for formula (3-b), and $R^3$ is as defined above for formula (4); and b) condensing the compound of formula (5) to produce the polymer, wherein the polymer comprises repeating units of formula wherein $R^{1a}$, $R^{1b}$, $R^{1c}$, $R^{1d}$ and $R^2$ are as defined above for formula (3-b).

11. A method of producing a polymer comprising:

a) combining a compound of formula (1) with a nitrogen-containing compound of formula (2) and an organic solvent, or combining a compound of formula (1) with a nitrogen-containing compound of formula (2) under non-aqueous conditions, to produce a compound of formula (3-b), wherein:

the compound of formula (1) is wherein each $R^{1a}$, $R^{1b}$, $R^{1c}$ and $R^{1d}$ is independently H or alkyl, the nitrogen-containing compound of formula (2) is $R^2-NH^2$, wherein $R^2$ is H or alkyl; and the compound of formula (3-b) is

(3-b)

wherein $R^{1a}$, $R^{1b}$, $R^{1c}$ and $R^{1d}$ are as defined above for formula (1), and $R^2$ is as defined above for formula (2);

b) combining the compound of formula (3-b) with an alcohol of formula (4) and a halogenating agent to produce a compound of formula (5), wherein:

the alcohol of formula (4) is $R^3OH$, wherein $R^3$ is alkyl; and the compound of formula (5) is wherein $R^{1a}$, $R^{1b}$, $R^{1c}$, $R^{1d}$ and $R^2$ are as defined above for formula (3-b), and $R^3$ is as defined above for formula (4); and c) condensing the compound of formula (5) to produce the polymer, wherein the polymer comprises repeating units of formula wherein $R^{1a}$, $R^{1b}$, $R^{1c}$, $R^{1d}$ and $R^2$ are as defined above for formula (3-b).

12. The method of embodiment 10 or 11, wherein $R^3$ is $C_{1-6}$ alkyl.

13. The method of embodiment 10 or 11, wherein $R^3$ is methyl or ethyl.

14. The method of any one of embodiments 10 to 13, further comprising isolating the compound of formula (5) prior to condensing to produce the polymer.

15. The method of any one of embodiments 11 to 14, further comprising isolating the compound of formula (3-b) prior to combining with the alcohol of formula (4) and the halogenating agent to produce the compound of formula (5).

16. The method of any one of embodiments 10 to 15, wherein the halogenating agent is a chlorinating agent.

17. The method of any one of embodiments 10 to 15, wherein the halogenating agent is $SOCl_2$, $POCl_3$, $PCl_3$, $SOBr_2$, $POBr_3$, or $PBr_3$, or any combinations thereof.

18. The method of any one of embodiments 10 to 17, wherein the method is performed under anhydrous conditions.

19. The method of any one of embodiments 10 to 17, wherein the compound of formula (3-b) is combined with the alcohol of formula (4) and the halogenating agent under anhydrous conditions to produce the compound of formula (5).

20. The method of any one of embodiments 10 to 17, wherein the compound of formula (3-b), the alcohol of formula (4), and the halogenating agent each independently has less than 5%, less than 4%, less than 3%, less than 2%, or less than 1% by weight of water.

21. The method of any one of embodiments 1 to 20, wherein $R^{1a}$ is H.

22. The method of any one of embodiments 1 to 20, wherein $R^{1a}$ is alkyl.

23. The method of embodiment 22, wherein $R^{1a}$ is $C_{1-6}$ alkyl.

24. The method of embodiment 22, wherein $R^{1a}$ is methyl, ethyl or propyl.

25. The method of any one of embodiments 1 to 24, wherein $R^{1b}$ is H.

26. The method of any one of embodiments 1 to 24, wherein $R^{1b}$ is alkyl.

27. The method of embodiment 26, wherein $R^{1b}$ is $C_{1-6}$ alkyl.

28. The method of embodiment 26, wherein $R^{1b}$ is methyl, ethyl or propyl.

29. The method of any one of embodiments 1 to 28, wherein $R^{1c}$ is H.

30. The method of any one of embodiments 1 to 28, wherein $R^{1c}$ is alkyl.

31. The method of embodiment 30, wherein $R^{1c}$ is $C_{1-6}$ alkyl.

32. The method of embodiment 30, wherein $R^{1c}$ is methyl, ethyl or propyl.

33. The method of any one of embodiments 1 to 32, wherein $R^{1d}$ is H.

34. The method of any one of embodiments 1 to 32, wherein $R^{1d}$ is alkyl.

35. The method of embodiment 34, wherein $R^{1d}$ is $C_{1-6}$ alkyl.

36. The method of embodiment 34, wherein $R^{1d}$ is methyl, ethyl or propyl.

37. The method of any one of embodiments 1 to 36, wherein $R^2$ is H.

38. The method of any one of embodiments 1 to 36, wherein $R^2$ is alkyl.

39. The method of embodiment 38, wherein $R^2$ is $C_{1-6}$ alkyl.

40. The method of embodiment 38, wherein $R^2$ is methyl, ethyl, propyl or butyl.

41. The method of any one of embodiments 1 to 40, wherein the polymer has a biocontent of at least 10%, at least 20%, at least 30%, at least 40%, at least 50%, at least 60%, at least 70%, at least 80%, at least 90%, at least 95% or about 100%.

42. The method of any one of embodiments 1 to 9 and 21 to 41, wherein the compound of formula (3-a) is obtained from renewable feedstock.

43. The method of any one of embodiments 10 to 41, wherein the compound of formula (3-a) is obtained from renewable feedstock.

44. The method of any one of embodiments 2, 4, and 11 to 43, wherein the compound of formula (1) is obtained from renewable feedstock.

45. The method of any one of embodiments 2, 4, and 11 to 44, wherein the compound of formula (2) is obtained from renewable feedstock.

46. A polymer produced according to the method of any one of embodiments 1 to 45.

EXAMPLES

The following Examples are merely illustrative and are not meant to limit any aspects of the present disclosure in any way.

Example 1

Synthesis of poly(β-alanine)

This Example demonstrates the synthesis of poly((3-alanine) from beta-propiolactone.

Synthesis of 3-hydroxypropioamide

In a 300 mL Parr reactor, 60 mL of 28-30% ammonia in water solution was added. To this solution, 5.0 mL of beta-propiolactone was added at about 26° C. The reaction mixture was stirred for 4 h. The reaction mixture was then stripped of volatiles by a rotovap and a high-vacuum. The product from this first step was analyzed by $^1$H NMR.

$^1$H NMR (DMSO-d6) δ (ppm), 7.28 (s, 1H, NH), 6.78 (s, 1H, NH), 5.15 (br s, 1H, OH), 3.58 (t, 2H, $CH_2$), 2.19 (t, 2H, $CH_2$). The $^1$H NMR data confirmed that this product was 3-hydroxypropioamide.

Synthesis of poly(β-alanine)

In a round bottom flask, 1.2 g of 3-hydroxypropioamide and 0.10 g of sodium carbonate was added. The flask was connected to a distillation head and a collection flask. The mixture was heated to about 200° C. under nitrogen for 5 h. The residual solid was analyzed by $^1$H NMR.

$^1$H NMR ($D_2O$, 10% HFIP) δ (ppm), 3.39 (m, $CH_2$), 2.39 (m, $CH_2$). The $^1$H NMR data showed about 70% conversion of 3-hydroxypropioamide to poly((3-alanine).

What is claimed is:

1. A method of producing a polymer, comprising:
   contacting an alkylene oxide and carbon monoxide to form a compound of formula (1);
   combining the compound of formula (1) with a nitrogen-containing compound of formula (2) under aqueous conditions to produce a compound of formula (3-a), wherein:

the compound formula (1) is wherein each $R^{1a}$, $R^{1b}$, $R^{1c}$ and $R^{1d}$ is independently H or alkyl, the nitrogen-containing compound of formula (2) is $R^2$—$NH_2$, wherein $R^2$ is H or alkyl, and combining the compound of formula (3-a) with a weak base to produce the polymer, wherein:

the compound of formula (3-a) is (3-a)

wherein each $R^{1a}$, $R^{1b}$, $R^{1c}$, $R^{1d}$ and $R^2$ is independently H or alkyl, and the polymer comprises repeating units of formula or a salt thereof wherein each $R^{1a}$, $R^{1b}$, $R^{1c}$, $R^{1d}$ and $R^2$ are as defined above for formula (3-a).

2. The method of claim 1, further comprising isolating the compound of formula (3-a) prior to combining with the weak base to produce the polymer.

3. The method of claim 1, wherein the nitrogen-containing compound of formula (2) is aqueous ammonia.

4. The method of claim 1, wherein the weak base has a pKb value between 7.2 and 10.4.

5. The method of claim 1, wherein the weak base is a carbonate salt or a bicarbonate salt, or a combination thereof.

6. The method of claim 1, wherein the weak base is sodium carbonate, potassium carbonate, calcium carbonate, magnesium carbonate, sodium bicarbonate, potassium bicarbonate, calcium bicarbonate, or magnesium bicarbonate or any combinations thereof.

7. The method of claim 1, wherein the polymer is produced from the compound of formula (3-a) at a temperature of at least 70° C.

8. The method of claim 1, wherein the polymer is produced from the compound of formula (3-a) at a temperature between 80° C. to 160° C.

9. The method of claim 1, wherein $R^{1a}$ is H.

10. The method of claim 1, wherein $R^{1a}$ is alkyl.

11. The method of claim 10, wherein $R^{1a}$ is $C_{1-6}$ alkyl.

12. The method of claim 10, wherein $R^{1a}$ is methyl, ethyl or propyl.

13. The method of claim 1, wherein $R^{1b}$ is H.

14. The method of claim 1, wherein $R^{1b}$ is alkyl.

15. The method of claim 14, wherein $R^{1b}$ is $C_{1-6}$ alkyl.

16. The method of claim 14, wherein $R^{1b}$ is methyl, ethyl or propyl.

17. The method of claim 1, wherein $R^{1c}$ is H.

18. The method of claim 1, wherein $R^{1c}$ is alkyl.

19. The method of claim 18, wherein $R^{1c}$ is $C_{1-6}$ alkyl.

20. The method of claim 18, wherein $R^{1c}$ is methyl, ethyl or propyl.

21. The method of claim 1, wherein $R^{1d}$ is H.

22. The method of claim 1, wherein $R^{1d}$ is alkyl.

23. The method of claim 22, wherein $R^{1d}$ is $C_{1-6}$ alkyl.

24. The method of claim 22, wherein $R^{1d}$ is methyl, ethyl or propyl.

25. The method of claim 1, wherein $R^2$ is H.

26. The method of claim 1, wherein $R^2$ is alkyl.

27. The method of claim 26, wherein $R^2$ is $C_{1-6}$ alkyl.

28. The method of claim 26, wherein $R^2$ is methyl, ethyl, propyl or butyl.

29. The method of claim 1, wherein the polymer has a biocontent of at least 10%.

30. The method of claim 1, wherein the compound of formula (1) is obtained from renewable feedstock.

31. The method of claim 1, wherein the compound of formula (2) is obtained from renewable feedstock.

32. The method of claim 1, wherein the polymer is converted from the compound of formula (3-a) in an amount of about 70 percent.

33. The method of claim 1, wherein the polymer is produced from the compound of formula (3-a) after heating to a temperature of about 180 degrees Celsius, and wherein the polymer is produced from the compound of formula (3-a) after 5 hours.

34. The method of claim 1, wherein the polymer is produced under a gas stream comprising nitrogen.

35. The method of claim 1, wherein the alkylene oxide comprises ethylene oxide.

* * * * *